(12) United States Patent
Soramäki et al.

(10) Patent No.: US 11,381,467 B2
(45) Date of Patent: Jul. 5, 2022

(54) METHOD AND SYSTEM FOR GENERATING SYNTHETIC DATA FROM AGGREGATE DATASET

(71) Applicant: FINANCIAL NETWORK ANALYTICS LTD, London (GB)

(72) Inventors: Kimmo Soramäki, London (GB); Samantha Cook, London (GB); Lubos Pernis, London (GB)

( * ) Notice: Subject to any disclaimer, the term of this patent is extended or adjusted under 35 U.S.C. 154(b) by 83 days.

(21) Appl. No.: 17/022,206

(22) Filed: Sep. 16, 2020

(65) Prior Publication Data

US 2022/0086054 A1 Mar. 17, 2022

(51) Int. Cl.
| | |
|---|---|
| *H04L 41/14* | (2022.01) |
| *G06N 20/00* | (2019.01) |
| *G06Q 40/02* | (2012.01) |
| *G06N 3/00* | (2006.01) |
| *H04L 67/131* | (2022.01) |

(52) U.S. Cl.
CPC .......... *H04L 41/145* (2013.01); *G06N 20/00* (2019.01)

(58) Field of Classification Search
CPC . H04L 41/145; H04L 29/06034; G06N 20/00; G06N 3/008; G06N 3/006; G06Q 40/025; G06T 13/00
See application file for complete search history.

(56) References Cited

U.S. PATENT DOCUMENTS

| | | | |
|---|---|---|---|
| 2009/0204528 A1* | 8/2009 | Moses | G06Q 40/00 705/35 |
| 2011/0110364 A1* | 5/2011 | Fried | G06Q 30/02 370/352 |
| 2013/0282819 A1* | 10/2013 | Mehta | G06Q 50/01 709/204 |
| 2014/0052538 A1* | 2/2014 | Foote | G06Q 30/02 709/204 |
| 2016/0232378 A1* | 8/2016 | Bosnic, Jr. | H04L 67/04 |
| 2017/0103432 A1* | 4/2017 | Borchetta | H04L 67/38 |
| 2021/0342545 A1* | 11/2021 | Avshalomov | G06F 16/2457 |
| 2021/0342785 A1* | 11/2021 | Mann | G06N 20/00 |
| 2021/0358023 A1* | 11/2021 | Melcher | G06F 3/14 |

* cited by examiner

*Primary Examiner* — Chris Parry
*Assistant Examiner* — Hassan A Khan
(74) *Attorney, Agent, or Firm* — RC Trademark Company

(57) ABSTRACT

Disclosed is a method for generating synthetic data from an aggregate dataset related to a plurality of entities. The method comprises defining a set of personas, selecting a network generation model, defining a network topology and generating the synthetic data. The set of personas is defined based on a number of the plurality of entities and/or a type of at least one of the plurality of entities. The network generation model is selected based on the defined set of personas and the aggregate dataset related thereto. The generated network topology comprises nodes and links between nodes using the selected network generation model. The node represents one of the personas in the set of personas. The link between two nodes represent one or more transactions between the personas represented by the two nodes. The generated synthetic data is based on information about distribution of the one or more transactions.

13 Claims, 14 Drawing Sheets

602

| sender | receiver | value |
|--------|----------|-------|
| A | B | ? |
| A | B | ? |
| A | B | ? |
| A | B | ? |
| B | C | ? |
| B | C | ? |
| B | C | ? |
| C | B | ? |
| C | B | ? |
| C | A | ? |
| C | A | ? |
| C | A | ? |
| C | A | ? |

| sender | receiver | value |
|--------|----------|-------|
| A | B | 2.5 |
| A | B | 2.5 |
| A | B | 2.5 |
| A | B | 2.5 |
| B | C | 1.33 |
| B | C | 1.33 |
| B | C | 1.33 |
| C | B | 4 |
| C | B | 4 |
| C | A | 1.25 |
| C | A | 1.25 |
| C | A | 1.25 |
| C | A | 1.25 |

FIG. 6C

| time | sender | receiver | value |
|------|--------|----------|-------|
| ? | A | B | ? |
| ? | A | B | ? |
| ? | A | B | ? |
| ? | A | B | ? |
| ? | B | C | ? |
| ? | B | C | ? |
| ? | B | C | ? |
| ? | C | B | ? |
| ? | C | B | ? |
| ? | C | A | ? |
| ? | C | A | ? |
| ? | C | A | ? |
| ? | C | A | ? |

METHOD AND SYSTEM FOR GENERATING SYNTHETIC DATA FROM AGGREGATE DATASET

TECHNICAL FIELD

The present application relates generally to transaction networks; and more specifically, to methods and systems for generating synthetic data from aggregate dataset related to a plurality of entities. Moreover, the present application relates to a computer-readable medium carrying instructions that when loaded into and executed by a data processing arrangement causes the data processing arrangement to execute the aforementioned method. Furthermore, the present application relates to a software module system comprising software modules to be executed by a data processing arrangement for generating synthetic data from an aggregate dataset related to a plurality of entities.

BACKGROUND

With the advent of the digital revolution, the financial sector has grown by leaps and bounds. Financial institutes generate a huge volume of data that is extremely complex and varied. These datasets are often stored in data silos within organisations for various reasons, including but not limited to, regulatory requirements and business needs. Data sharing within different lines of business as well as outside of the organisation is severely limited. Regulatory requirements may prevent data sharing even between different lines of business within a company. Further, there is a limited amount of historical data to study certain events (e.g. flash crashes in the market, recessions, new regimes of behaviour) that make studying the underlying mechanisms very challenging.

Financial institutes possess large quantities of granular confidential datasets. Examples of such datasets include trade repositories, payments data or granular loan data. The recent methodological progress allows organisations to operationalize these datasets using machine-learning (ML) or artificial intelligence (AI) and so to derive value from them. Examples of such operationalizations range from monitoring to prediction applications. However, as discussed, obtaining access to the granular data can be very difficult due to two principal reasons. First, data sourcing might underlie numerous internal approval procedures involving multiple stakeholders. If the organization is sufficiently complex, this can result in long delays in data sourcing. Second, the data might be highly classified or subjected to the need to know principle. Practically, in the current framework there is latency between the point where granular data is collected and operationalized, and the data may not even be available.

A key lesson from the various financial crisis has been that despite the deployment of advanced analytics models by financial institutions (statistical and stress-based, among others), they did not provide an understanding of how risk might propagate across the complex global financial system, in terms of liquidity impacts, counterparty relationships and other market connections. For example, fraud and fraud detection is an important problem that has a number of applications in diverse domains. However, in order to investigate, develop, test and improve for example fraud detection techniques one needs detailed information about the domain and its specific problems. Above discussed factors result in lack of datasets available for research in fields such as money laundering, financial fraud and illegal payments, making such investigations, developments, tests and improvements practically impossible.

Individual financial institutes utilize some network analytics and related visualisation methods which offer financial authorities and market participants with some level of understanding of the degree and meaning of these interconnections. For example, machine learning and artificial intelligence may be implemented on such datasets for prediction applications such as prediction of a bank failure, for monitoring purposes. such as for risk analysis and for economic analysis. However, there is a need to integrate multiple data sources to understand and visualise participants' interrelationships, and to look at multiple factors in understanding interconnectedness among market institutions in order to model and stress-test risk propagation across these networks. For instance, for use cases such as fraud detection, the datasets are usually highly imbalanced, and traditional machine learning and anomaly detection techniques often fail.

Other areas where synthetic data is utilized are simulations to estimate liquidity use, conduct stress tests, and for understanding the effects of making a change to an existing payment system or of changes to an entirely new system Realistic synthetic data, along with appropriate data imputation techniques offer a promising approach to tackle this challenge. Synthetic data are generated to meet specific needs or certain conditions that may not be found in the original, real data. This can be useful when designing any type of system because the synthetic data are used as a simulation or as a theoretical value, situation, etc. The synthetic data takes into account unexpected results and have a basic solution or remedy, if the results prove to be unsatisfactory. Synthetic data are often generated to represent the authentic data and allows a baseline to be set. It is important to investigate methods for synthesising financial datasets that follow the same properties of the real data while respecting the need for privacy of the parties involved in a particular dataset. Current approaches for synthetic data generation from raw data typically involve manual synthetic generation, which is time consuming and labour intensive.

Therefore, in light of the foregoing discussion, there exists a need to overcome various problems associated with generating synthetic data, as known in the art.

SUMMARY

One object of the teachings herein is to overcome or at least mitigate the problems of the prior art.

The inventors have realized after inventive and insightful reasoning, that the granular data in financial or banking sector is hard to get access of and suffers from latency. The teachings of the present application aim to at least partially overcome or mitigate problems such as access to granular data, and latency between the point where the granular data is collected and operationalized. The present disclosure seeks to provide a method and a system for generating synthetic data from an aggregate dataset related to a plurality of entities. An aim of the present disclosure is to provide a solution that overcomes at least partially the problems encountered in prior art, and provides a method for generating synthetic data that decreases the time required until value can be realized from a particular dataset.

According to one aspect, the object is achieved by providing a method for generating synthetic data from an aggregate dataset related to a plurality of entities, the method comprising:

defining a set of personas, wherein the set of personas is defined based on a number of the plurality of entities and/or a type of at least one of the plurality of entities;

selecting a network generation model based on the defined set of personas and the aggregate dataset related thereto;

generating a network topology comprising nodes and links between nodes using the selected network generation model, wherein a node represents one of the personas in the set of personas, and wherein a link is between two nodes, the link representing one or more transactions between the personas represented by the two nodes; and generating the synthetic data including information about distribution of the one or more transactions based on the created network topology and the aggregate dataset.

Embodiments of the present disclosure enable the method for generating synthetic data from an aggregate dataset related to a plurality of entities. Since, as discussed, the granular data in financial or banking sector is hard to get access to and suffers from latency issues, the present method will help decrease the time required until value can be realized from a particular dataset by solving problems, such as access to granular data, and latency between the point where the granular data is collected and operationalized.

In an embodiment, the method further comprises:

defining a probability distribution of the one or more transactions; and tuning the parameters of the defined probability distribution based on the aggregate dataset for generating the synthetic data.

In an embodiment, each of the links of the method for generating synthetic data is assigned with a link weight value representing one or more of number of the transactions and value of the transactions associated with the corresponding link.

In an embodiment, at least one of number of links and the link weight values associated with the links for any one of the nodes are determined based on one or more of total inflows and total outflows for the corresponding node.

In an embodiment, the method further comprises scaling value of the transactions for any one of the nodes based on degree of association of the corresponding node in the network topology.

In an embodiment, the network generation model utilizes market share information about the entitles to generate the network topology.

In an embodiment, the method further comprises tuning the network generation model based on available information related to the multiple entities, such that the generated network topology from the tuned network generation model corresponds to actual network topology of multiple entities.

In an embodiment, the network generation model is based on a Maximum Entropy network model configured to maximize the number of links in the network topology.

In an embodiment, the network generation model is based on a Minimum Density network model configured to minimize the number of links in the network topology.

In an embodiment, the network generation model is based on a Scale-free Network model configured to define the nodes and the links such that the network topology follows a power law distribution.

In an embodiment, the aggregate dataset is one of a loan dataset and a payment dataset.

In an embodiment, the aggregate dataset comprises one or more of: mean, median, minimum and maximum of the transaction values associated with the multiple entities.

According to one aspect, the object is achieved by providing a system for generating synthetic data from an aggregate dataset related to a plurality of entities, the system comprising a data processing arrangement configured to:

define a set of personas, wherein the set of personas is defined based on a number of the plurality of entities and/or a type of at least one of the plurality of entities;

select a network generation model based on the defined set of personas and the aggregate dataset related thereto;

generate a network topology comprising nodes and links between nodes using the selected network generation model, wherein a node represents one of the personas in the set of personas, and wherein a link is between two nodes, the link representing one or more transactions between the personas represented by the two nodes; and generate the synthetic data including information about distribution of the one or more transactions based on the created network topology and the aggregate dataset.

According to one aspect, the object is achieved by providing a software module system comprising software modules to be executed by a data processing arrangement for generating synthetic data from an aggregate dataset related to a plurality of entities, wherein the software modules comprise:

a software module for defining a set of personas, wherein the set of personas is defined based on a number of the plurality of entities and/or a type of at least one of the plurality of entities;

a software module for selecting a network generation model based on the defined set of personas and the aggregate dataset related thereto;

a software module for defining a network topology comprising nodes and links between nodes using the selected network generation model, wherein a node represents one of the personas in the set of personas, and wherein a link is between two nodes, the link representing one or more transactions between the personas represented by the two nodes; and a software module for generating the synthetic data including information about distribution of the one or more transactions based on the created network topology and the aggregate dataset.

According to one aspect, the object is achieved by providing a computer-readable medium carrying instructions that when loaded into and executed by a data processing arrangement causes the data processing arrangement to execute any of the methods.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 6B-6C are tables for representing values of the network topology of FIG. 6A, according to one embodiment of the teachings herein;

DETAILED DESCRIPTION

Figure 1A:
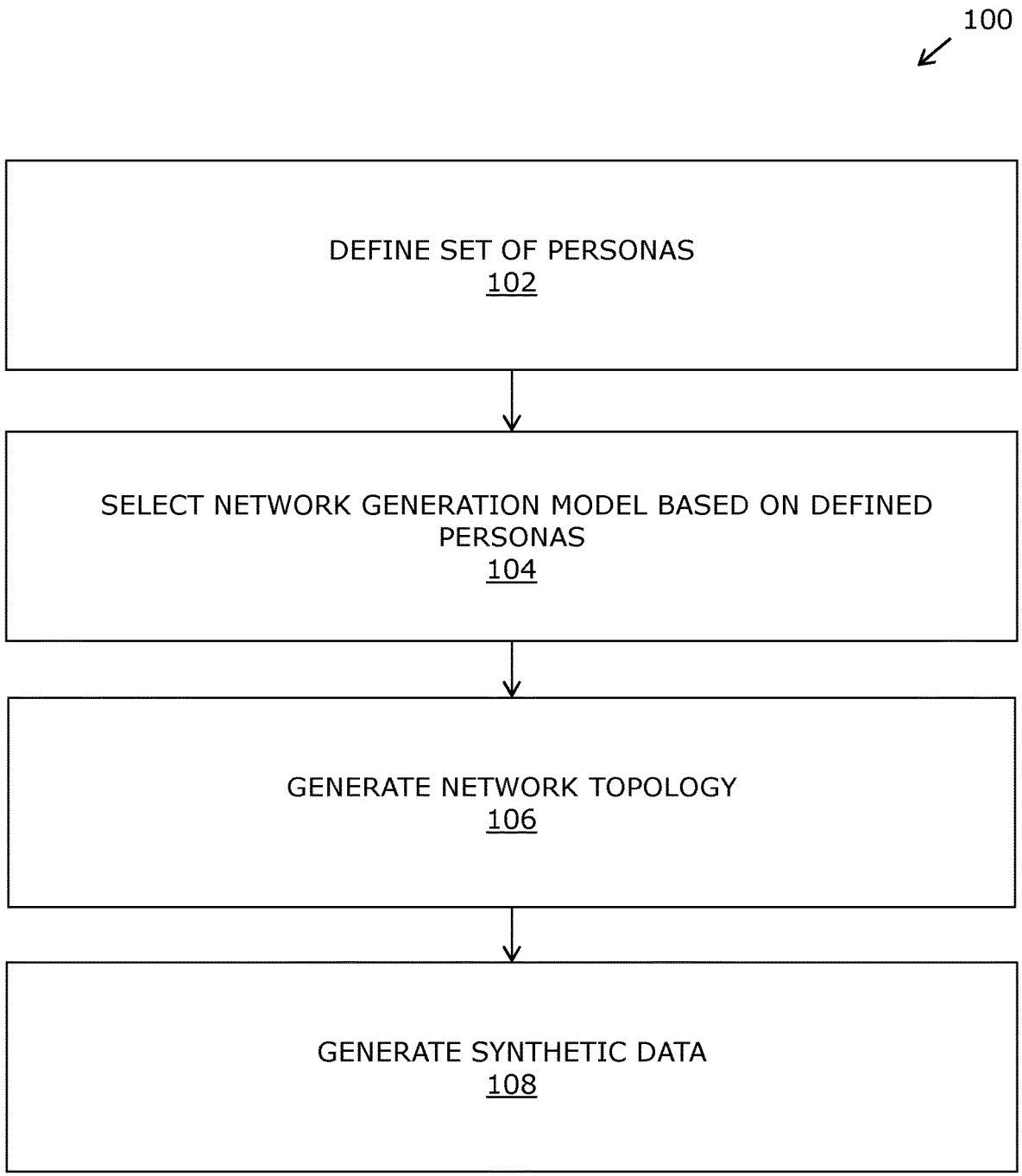
FIG. 1A is a flowchart listing steps of a method for generating synthetic data from an aggregate dataset involving multiple entities, according to one embodiment of the teachings herein.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for generating synthetic data from an aggregate dataset related to a plurality of entities, the method comprising:

defining a set of personas, wherein the set of personas is defined based on a number of the plurality of entities and/or a type of at least one of the plurality of entities;

selecting a network generation model based on the defined set of personas and the aggregate dataset related thereto;

generating a network topology comprising nodes and links between nodes using the selected network generation model,
  wherein a node represents one of the personas in the set of personas, and
  wherein a link is between two nodes, the link representing one or more transactions between the personas represented by the two nodes; and generating the synthetic data including information about distribution of the one or more transactions based on the created network topology and the aggregate dataset.

In one aspect, an embodiment of the present disclosure provides a system for generating synthetic data from an aggregate dataset related to a plurality of entities, the system comprising a data processing arrangement configured to:

define a set of personas, wherein the set of personas is defined based on a number of the plurality of entities and/or a type of at least one of the plurality of entities;

select a network generation model based on the defined set of personas and the aggregate dataset related thereto;

generate a network topology comprising nodes and links between nodes using the selected network generation model,
  wherein a node represents one of the personas in the set of personas, and
  wherein a link is between two nodes, the link representing one or more transactions between the personas represented by the two nodes; and generate the synthetic data including information about distribution of the one or more transactions based on the created network topology and the aggregate dataset.

It should be noted that generally the system as per herein is arranged to execute the method(s) according to herein, and any statement pertaining to the method, also applies to the system.

In one aspect, an embodiment of the present disclosure provides a software module system comprising software modules to be executed by a data processing arrangement for generating synthetic data from an aggregate dataset related to a plurality of entities, wherein the software modules comprise:

a software module for defining a set of personas, wherein the set of personas is defined based on a number of the plurality of entities and/or a type of at least one of the plurality of entities;

a software module for selecting a network generation model based on the defined set of personas and the aggregate dataset related thereto;

a software module for generating a network topology comprising nodes and links between nodes using the selected network generation model,
  wherein a node represents one of the personas in the set of personas, and
  wherein a link is between two nodes, the link representing one or more transactions between the personas represented by the two nodes; and a software module for generating the synthetic data including information about distribution of the one or more transactions based on the created network topology and the aggregate dataset.

The present disclosure relates to a system and a method for generation of synthetic loan and payments data mimicking the properties of the real data. The objective of the present disclosure is to reduce the data sourcing lead time and to mitigate any security or privacy concerns related to data sharing. The system and the method of the present disclosure generate synthetic data which mimic the statistical properties of real datasets but can be created and operationalised instantaneously, thereby decreasing the time required until value can be realised from a particular dataset. The properties of the synthetic dataset are such that they are close to the properties of the real confidential data. As mentioned above, the invention specialises in payments and loan data.

The present method of synthetic data generation is based on aggregate statistical properties of real loans or payments. The present method rests on aggregate publicly available data and/or expert judgment. Based on the combination of expert knowledge and the aggregate statistical properties of the data, the present method can recreate a granular dataset with aggregate statistical properties close to those known in the beginning of the problem. As an example, millions of loans or payments are created from a number of aggregate statistical properties, such as the mean, median, min, max, standard deviations and some rough distributions about the real data.

Referring to FIG. 1, illustrated are steps of a method 100 for generating synthetic data from an aggregate dataset involving multiple entities, according to one embodiment of the teachings herein. At step 102, a set of personas is defined. The set of personas is defined based on a number of the plurality of entities and/or a type of at least one of the plurality of entities. At step 104, a network generation model is selected based on the defined set of personas and the aggregate dataset related thereto. At step 106, a network topology is generated using the selected network generation model of step 104. The network topology comprises nodes and links between the nodes. Herein, a node represents one of the personas in the set of personas, and a link represents one or more transactions between two of the personas in the set of personas. At step 108, the synthetic data is generated including information about distribution of the one or more transactions based on the created network topology and the aggregate dataset.

The steps 102, 104, 106 and 108 are only illustrative and other alternatives can also be provided where one or more steps are added, one or more steps are removed, or one or more steps are provided in a different sequence without departing from the scope of the claims herein.

Figure 1B:
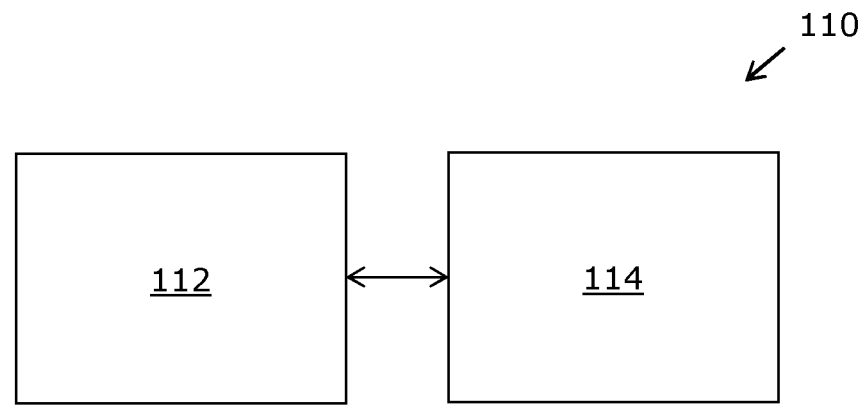
FIG. 1B is a schematic illustration of a system for generating synthetic data from an aggregate dataset involving multiple entities, according to one embodiment of the teachings herein.

Referring to FIG. 1B, shown is a block diagram of a system 110 for generating synthetic data from an aggregate dataset related to a plurality of entities, according to one embodiment of the teachings herein. The system 110 comprises a data processing arrangement 112. Optionally, the system 110 comprises the data repository 114. In the system 110, the data processing arrangement 112 is communicably coupled to a data repository 114. The data processing arrangement 112 is configured to define a set of personas. Herein, the set of personas is defined based on a number of the plurality of entities and/or a type of at least one of the plurality of entities. The data processing arrangement 112 is further configured to select a network generation model based on the defined set of personas and the aggregate dataset related thereto. The data processing arrangement 112 is further configured to generate a network topology comprising nodes and links between nodes using the selected network generation model. Herein, a node represents one of the personas in the set of personas, and a link represents one or more transactions between two of the personas in the set of personas. The data processing arrangement 112 is further configured to generate the synthetic data including information about distribution of the one or more transactions based on the created network topology and the aggregate dataset.

Figure 1C:
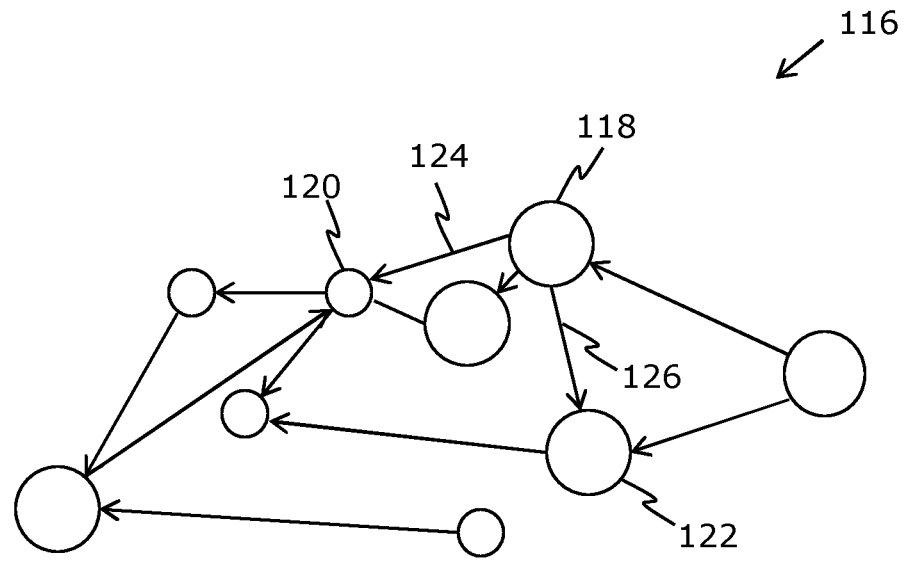
FIG. 1C is a schematic illustration of a transaction network, according to one embodiment of the teachings herein.

Referring to FIG. 1C, there is shown a schematic illustration of a transaction network 116, according to one embodiment of the teachings herein. The transaction network 116 comprises a plurality of nodes, such as the nodes 118, 120, 122, and connections, such as the connections 124 and 126, therebetween. In the present examples, the transaction network 116 is a financial transaction network. Other examples of such transaction network 116 include, but are not limited to, a communication network, a social data network, an e-commerce network, a transportation network, a share market network, and payments and securities settlement groups.

The system and method of the present disclosure is advantageous for generating synthetic data from the aggregate dataset involving multiple entities. The two major advantages of the system and method of the present disclosure are easy interpretability and enhanced speed of execution. The easy interpretability is key in situations where stakeholders working with the data demand high transparency of the methods used. Moreover, since the method of synthetic data generation only depends on aggregate properties of the system, which are often publicly available, synthetic data can be generated rapidly. This decreases the time needed until analysts can start using the data for analysis. The system and method of the present disclosure are relatively straightforward and can be implemented in any programming language and, results can be obtained in a significantly short time periods, even for large datasets.

Throughout the present disclosure, the term "data processing arrangement" as used herein relates to programmable and/or non-programmable components configured to execute one or more software application for storing, processing, sharing data and/or set of instructions. Optionally, the data processing arrangement 112 is a set of one or more hardware components or a multi-processor system, depending on a particular implementation. More optionally, the data processing arrangement 112 includes, for example, a component included within an electronic communications network. Additionally, the data processing arrangement 112 includes one or more data processing facilities for storing, processing, sharing data and/or set of instructions. Optionally, the data processing arrangement 112 includes functional components, for example, a processor, a memory, a network adapter and so forth.

Throughout the present disclosure the term "transaction network" as used herein refers to a network model created from transaction data. The transaction network 116 allows consumers, merchants, financial institutions and other third parties to interact with each other and strengthen their relationships by enabling efficient and secure transaction processing and reducing risks. The transaction network 116 comprises a plurality of nodes, such as the nodes 118, 120, 122, and connections, such as the connections 124 and 126, therebetween. In an embodiment, the plurality of nodes, such as the nodes 118, 120, 122, represent financial institutions. The financial institutions include, but are not limited to, banks, central banks, corporations, payment and securities settlement systems, and other third parties. The connections 124, 126 depict flow of the assets from one node (namely sender) to another node (namely receiver) through the transaction network 116.

In an embodiment, the transaction network, such as the transaction network 116, is a financial transaction network and the transaction data are financial transaction data. The term "transaction data" as used herein refers to information relating to transactions. The transaction data is stored in a data repository 114 held and maintained by various financial institutions, such as banks, central banks, regulators, auditors, investors, payment and securities settlement systems, other third parties, and so forth. It may be appreciated that if all data is stored in a single repository, typically only a single institution would maintain it. In some implementations, the data may be stored over many repositories, each being maintained by a different institution (e.g. if each bank in a system has access to only those transactions that it sent or received).

The data repository 114 stores any type of transaction data in a structured or unstructured format. In an embodiment, the transaction data comprises information relating to at least one of: financial institutions involved in the transactions, types of the transactions, number of transactions, value of each transaction, a date and a time of the transactions. The transaction data further includes information related with an asset or a group of assets such as sender data, receiver data, historic transaction log data, date and time of a transaction data, the number and/or value of a transaction data, and so on. The transaction data allows for the creation of the transaction networks, and subsequent measurement of centrality or level of influence of a node at different time scales, for example weekly, daily, or hourly. Typically, the transaction happens between one node to another node of the transaction network at a fixed time period. Optionally, the transaction is processed in a local transaction network or a global transaction network. More optionally, the transaction data is influenced by regulatory changes, general market research and analysis, macro and microeconomic analysis, corporate or political regulations, disruptions in trading, communications from central bank, and so forth. Optionally, an asset or a group of assets refers to a liquidity, such as for example, financial assets (for example monetary funds, shares, mutual funds, cryptocurrency, and so on), payments or securities, and so forth.

Throughout the disclosure the term "synthetic data" refers to datasets that are artificially generated so as to match with a real-world data as closely as possible. Often the complete detail of real datasets is not available. For example, accessing of a confidential payment data or loan data may take a considerable amount of time. In such cases, the method 100 for generating synthetic data may be implemented to mimic the real data. In the said example, the synthetic data generation may be used for generation of millions of real-world payments data or loan data. In order to generate the synthetic data, some raw data or aggregate dataset is needed. The aggregate dataset is a collection of data that may contain collective information like standard deviation, mean, median, maxima, minima etc. of transaction values. In most cases, such aggregate dataset may be publicly available data. The generated synthetic data tries to replicate the real-world data closely in consideration of the known aggregate information.

Optionally, the aggregate dataset in the method 100 for generating synthetic data is one of a loan dataset and a payment dataset. Herein, the loan dataset may include information about loans request that may be received by banks and loan disbursed by the banks, and loans received by borrowers. That is, for the loan dataset, the aggregate dataset includes the value and volume of loans sent and received by each persona. In some examples, the content of the loan dataset may include one or more of "Loan_ID" which is a unique loan number assigned to each loan customers; "Loan_Status" which indicates whether a loan is paid off, in collection, new customer yet to payoff, or paid off after the collection efforts; "Terms of loans" which can be weekly, biweekly, and monthly payoff schedule; "Effective_Date" which provides when the loan got originated and took effects; "Paidoff_time" which indicates the actual time a customer pays off the loan; and customer's basic demographic information like business details, business type, etc. Similarly, herein, the payment dataset may include information about total number of financial transactions, total value of financial transactions, total number of banks in the system, etc.

Optionally, the aggregate dataset comprises one or more of mean, median, minimum and maximum of the transaction values associated with the multiple entities. As discussed, the aggregate information like mean, median, maximum and minimum of the real data that needs to be synthetically generated are generally known. The generated synthetic data may have to satisfy the said aggregate information. Often, the aggregate information may be used to further estimate the value of each transaction that exists between a pair of personas.

The method 100 comprises defining a set of personas, wherein the set of personas is defined based on a number of the plurality of entities and/or a type of at least one of the plurality of entities. Herein, the personas are defined on the basis of type and number of the plurality of entities. For example, for synthetic data generation of loan data entities, a set of banks and corporations may be defined as personas. Herein, the banks are the lenders and the corporations are the borrowers. That is, the banks lend to the corporations. For synthetic data generation of payment entities, a set of banks are defined as personas. The user may specify the profiles of different payment senders or receivers in the system. Herein, the transactions take place between banks. The number of the personas is dependent on the number of entities present in a real system. The number of the entities present in the real system is a basic knowledge that may be already known. For example, the United Kingdom's CHAPS (Clearing House Automated Payment System) payment or loan network has thirty-four banks (as of 2020) in its network. In such example, it may be understood that for generation of the synthetic data for the CHAPS network, the number of personas to be used would be thirty-four.

Figure 2A:
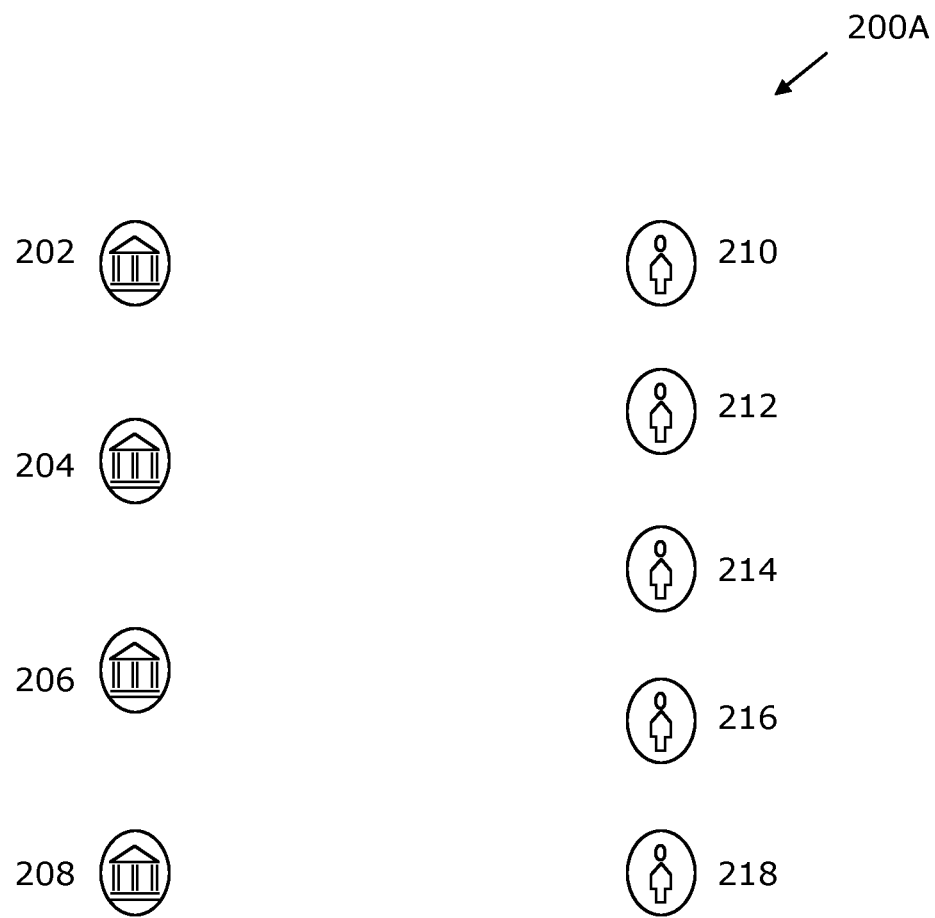
FIGS. 2A-2C are illustrations of steps involved in synthetic data generation utilizing various network generation models, according to one embodiment of the teachings herein.

Referring to FIG. 2A there is an illustration of an exemplary incomplete network model 200A showing personas for synthetic data generation, according to one embodiment of the teachings herein. Herein, the exemplary network model 200A comprises personas for the banks, including a first bank 202, a second bank 204, a third bank 206 and a fourth bank 208; and further personas for the borrowers, including, a first corporation 210, a second corporation 212, a third corporation 214, a fourth corporation 216 and a fifth corporation 218.

The method 100 further comprises selecting a network generation model based on the defined set of personas and the aggregate dataset related thereto. Once the personas are defined, a network generation model is selected based on what kind of aggregate information is available about the personas or the system in general. The aggregate dataset may include the number of banks and the number corporations for loan data. For payments, the aggregate dataset may include the number of large banks such as global systemically important banks (G-SIBs) in the system. Depending upon the available aggregate information, the network generation is chosen that establishes how the personas of the model interact with each other. The goal of the network generation model is to specify which personas transact together, how often they transact, and/or how much they transact.

The method 100 further comprises generating a network topology. Herein, the network topology comprises nodes, and links between nodes using the selected network generation model. Herein, a node represents one of the personas in the set of personas, and a link represents one or more transactions between the personas represented by the two nodes. As discussed, depending on the aggregate information a network topology is chosen that depicts the interrelations between the personas. Each of the personas is represented by a node. The personas are connected by links. A directed link from one persona to the other, represents that the former makes at least one transaction to the latter. It may be contemplated that, the links in the loan data links are directed only from the personas representing banks to the personas representing corporations. That is, there will be no links between two corporations or between two banks for loan data. Moreover, no links will be directed from corporations to banks. However, for payment data it may be appreciated that the links can be between any nodes, with all nodes being able to both send and receive payments.

Optionally, each of the links is assigned with a link weight value representing one or more of number of the transactions and value of the transactions associated with the corresponding link. In one embodiment, the link weights represent the number of transactions made from one bank to one corporation for loan data and the number of transactions made from one bank to another bank in case of payment data. In some cases, apart from providing the number of transactions, the links also provide information of the value of the transactions associated with the corresponding link.

Optionally, at least one of number of links and the link weight values associated with the links for any one of the nodes are determined based on total inflows and total outflows for the corresponding node. Often, the total number of transactions that is done by each persona is known. As discussed, the transactions are denoted by directed links. When the link is directed towards the node, this indicates some amount of money has been transferred to that node from some other node; and when a links outflows from the node, this indicates that some amount has transferred from that node to some other node. In an embodiment, the link is assigned a weight value equal to the number of transactions sent from the source node to the target node. For example, if five transaction takes place from a first node to a second node, then a link is directed having weight value of five from the first node to the second node. In another embodiment, rather than assigning weight values to the link, the same number of links are drawn between nodes based on total inflows and total outflows for the corresponding node. Herein, the total number of inflows and outflows done by a node is obtained by calculating the total number of links associated with that node. In such example, if five transaction takes place from a first node to a second node, then five links are directed from the first node to the second node.

Optionally, the network generation model utilizes market share information about the entitles to generate the network topology. Often, for payments the market share of some banks is provided.

This information may be exploited in order to undermine which of the banks in the real system are larger ones. The larger banks have higher market share and large number of transactions are possible from such banks. Moreover, higher value of transaction may also take place from such banks. Hence, the number of outgoing links for the larger banks will be higher.

Figure 2B:
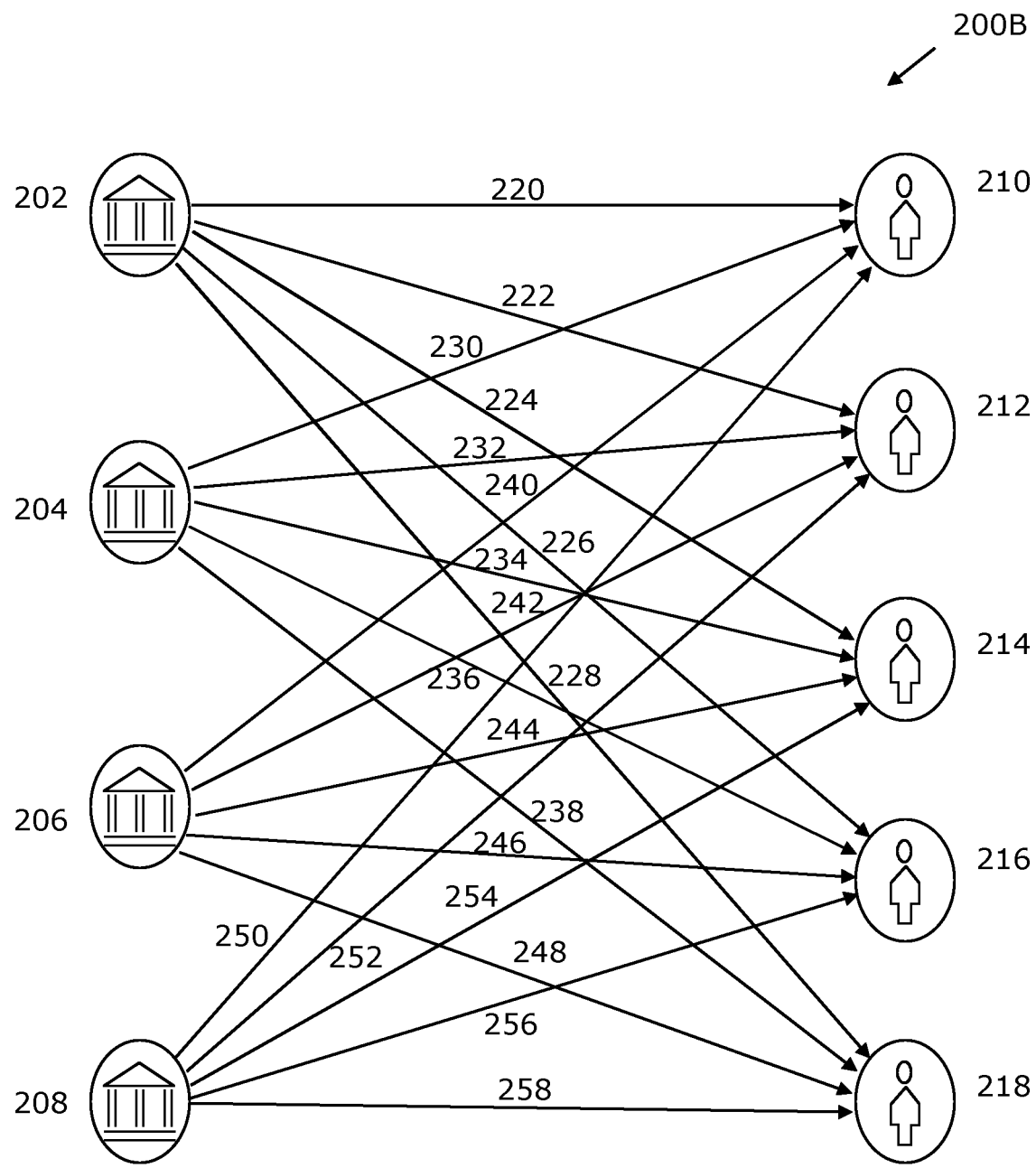
Figure 2C:
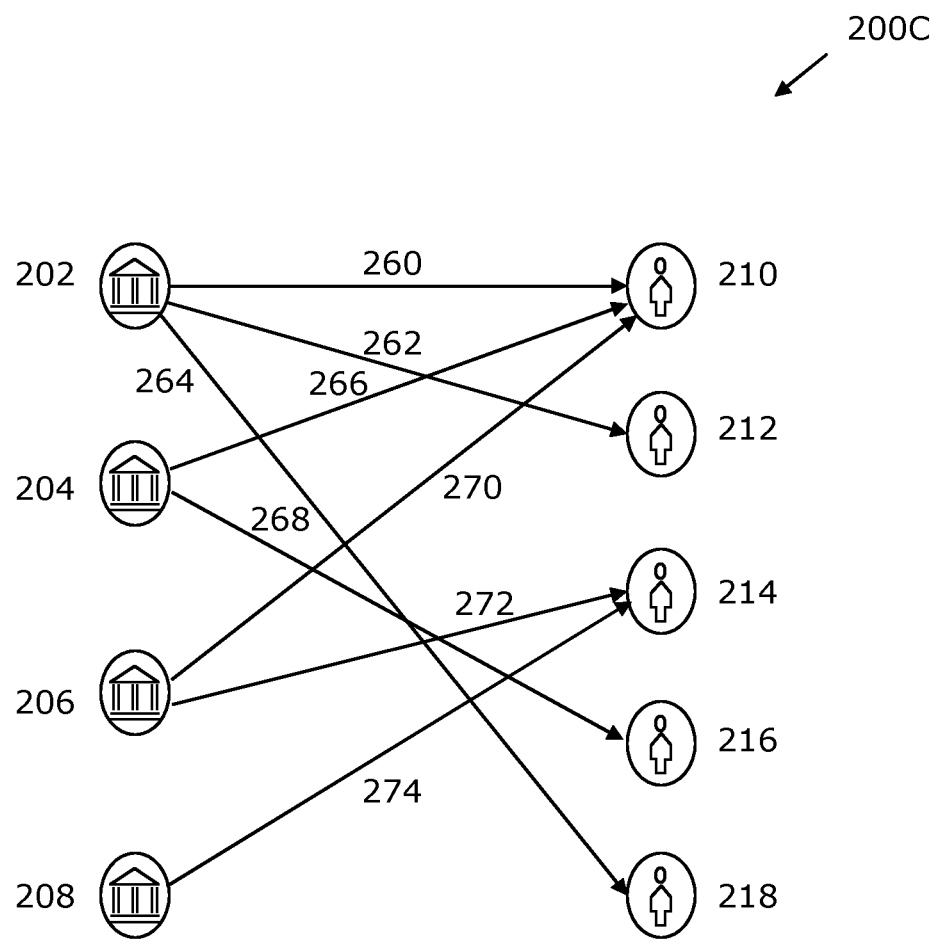

Referring to FIGS. 2B and 2C, illustrated are exemplary network topologies 200B and 200C with the set of personas of FIG. 2A, showing transactions therebetween in the form of links and corresponding link weights. In the illustrated exemplary network topologies 200B, 200C, the first bank 202 makes a total of 40 transactions, the second bank 204 makes a total of 25 transactions, the third bank 206 makes a total of 20 transactions, and the fourth bank 208 makes a total of 15 transactions. Further, the first corporation 210 receives a total of 35 transactions, the second corporation 212 receives a total of 25 transactions, the third corporation 214 makes a total of 20 transactions, the fourth corporation 216 receives a total of 15 transactions, and the fifth corporation 218 receives a total of 5 transactions.

As discussed, in the method 100, the network generation model is chosen based on the defined personas and the available aggregate information. In an embodiment, the network generation model is based on a Maximum Entropy network model which is configured to maximize the number of links in the network topology. Herein, the maximum entropy network model is a type of the network generation model configured to maximize the number of links in the network topology. It may be understood that, depending upon the number of personas, a set of nodes are taken. Next, according to the marginal values for each node, links are created between the nodes.

Herein, marginal value is the total number of inflows and outflows for a respective node. In order to implement the maximum entropy network model, the links are assigned by link weights such that the sum of ingoing and outgoing link weights is equal to the marginal value of the corresponding node. Moreover, the number of links is maximized in the network topology. It may be appreciated that for loan data, the marginal values correspond to total values of loans borrowed by each corporation and the total volume of loans made by each bank.

In order to generate the maximum entropy network model for the loan data, the links along with respective link weights are drawn such that the links are directed from nodes denoting banks to nodes representing corporations. Herein, the sum of outgoing link weights at each node representing banks is equal to the total volume of loans made by the respective bank, and the sum of incoming link weights at each node representing corporations is equal to the total volume of loans received by the respective corporation, while the total number of links in the network topology is maximized.

Referring to FIG. 2B, there is an illustration of an exemplary network topology 200B that maximizes the number of links therein for the personas of FIG. 2A, according to one embodiment of the teachings herein. As shown, the exemplary network topology 200B comprises a first link 220, a second link 222, a third link 224, a fourth link 226, a fifth link 228, a sixth link 230, a seventh link 232, an eighth link 234, a ninth link 236, a tenth link 238, a eleventh link 240, a twelfth link 242, a thirteenth link 244, a fourteenth link 246, a fifteenth link 248, a sixteenth link 250, a seventeenth link 252, a eighteenth link 254, a nineteenth link 256 and a twentieth link 258. The weights of each of the links are so chosen (based on the transactions data between the personas as provided in reference to FIG. 2A) so that the number of links in the network is maximized and the sum of weights associated with each node is equal to the marginal value of the respective node.

In the network topology 200B, the first link 220 having a weight of 14 units connects the first bank 202 with the first corporation 210. The second link 222 having a weight of 10 units connects the first bank 202 with the second corporation 212. The third link 224 having a weight of 8 units connects the first bank 202 with the third corporation 214. The fourth link 226 having a weight of 6 units connects the first bank 202 with the fourth corporation 216. The fifth link 228 having a weight of 2 units connects the first bank 202 with the fifth corporation 218. The sixth link 230 having a weight of 8.75 units connects the second bank 204 with the first corporation 210. The seventh link 232 having a weight of 6.25 units connects the second bank 204 with the second corporation 212. The eighth link 234 having a weight of 5 units connects the second bank 204 with the third corporation 214. The ninth link 236 having a weight of 3.75 units connects the second bank 204 with the fourth corporation 216. The tenth link 238 having a weight of 1.25 units connects the second bank 204 with the fifth corporation 218. The eleventh link 240 having a weight of 7 units connects the third bank 206 with the first corporation 210. The twelfth link 242 having a weight of 5 units connects the third bank 206 with the second corporation 212. The thirteenth link 244 having a weight of 4 units connects the third bank 206 with the third corporation 214. The fourteenth link 246 having a weight of 3 units connects the third bank 206 with the fourth corporation 216. The fifteenth link 248 having a weight of 1 unit connects the third bank 206 with the fifth corporation 218. The sixteenth link 250 having a weight of 5.25 units connects the fourth bank 208 with the first corporation 210. The seventeenth link 252 having a weight of 3.75 units connects the fourth bank 208 with the second corporation 212. The eighteenth link 254 having a weight of 3 units connects the fourth bank 208 with the third corporation 214. The nineteenth link 256 having a weight of 2.25 units connects the fourth bank 208 with the fourth corporation 216. The twentieth link 268 having a weight of 0.75 units connects the fourth bank 208 with the fifth corporation 218.

In another embodiment, the network generation model is based on a Minimum Density network model which is configured to minimize the number of links in the network topology. It is to be noted that the inputs of the minimum density network model are same as the maximum entropy network model. The goal of the minimum density network model is to define a set links with respective link weights such that the sum of incoming and outgoing link weights at each node is equal to its corresponding marginal value. Contrary to the maximum entropy network model, the number of links in the minimum density network model are minimized.

Referring to FIG. 2C, there is an illustration of an exemplary network topology 200C that that minimizes the number of links in the network topology for the personas of FIG. 2A, according to one embodiment of the teachings herein. The network topology 200C comprises a first link 260, a second link 262, a third link 264, a fourth link 266, a fifth link 268, a sixth link 270, a seventh link 272 and an eighth link 274. Herein, the weights are so chosen so that the number of links associated with each node is minimized and the sum of weights associated with each node is equal to the marginal value of the respective node.

In the network topology 200C, the first link 260 having a weight of 10 units connects the first bank 202 with the first corporation 210. The second link 262 having a weight of 25 units connects the first bank 202 with the second corporation 212. The third link 264 having a weight of 5 units connects the first bank 202 with the fifth corporation 218. The fourth link 266 having a weight of 10 units connects the second bank 204 with the first corporation 210. The fifth link 268 having a weight of 15 units connects the second bank 204 with the fourth corporation 216. The sixth link 270 having a weight of 15 units connects the third bank 206 with the first corporation 210. The seventh link 272 having a weight of 5 units connects the third bank 206 with the third corporation 214. The eighth link 274 having a weight of 15 units connects the fourth bank 208 with the third corporation 214.

It is to be noted that both the maximum entropy network model and the minimum density network model are used for generating synthetic loan data, because their required inputs align well with the kind of information that is usually available about the loan networks. The maximum entropy network model or the minimum density network model is selected depending on whether the underlying networks are likely to be dense or sparse in the real system. If the network is dense, that means a large number of links exits between the personas; and hence, the maximum entropy network model is optimum for such case. However, if the network is sparse, that means that the number of links existing between the personas are fewer (i.e. lesser number of personas are interacting with each other); and hence, minimum density network models would be efficient for such case. Many a times, no such information of the real system is known. In such cases, it may be desirable to use both the models for obtaining two sets of independent synthetic data. The synthetic data generated using both the network models may be analysed and the two sets of results may be used as bounds/as a range of plausible values.

In one or more examples, the maximum entropy and minimum density network models could also be used for creating synthetic payment data. However, it is less common to have complete information on inflows and outflows for all banks in the payment system. That is the exact number of payments, or amounts associated with the payments, that each bank makes and receives from all the other banks in the system combined is not generally known. Only some basic information like the number of banks and the number of payments done in the payment system may be known. Hence, often the maximum entropy and minimum density network models may not be suited for the payment system.

In an embodiment, the network generation model is on a Scale-free Network model which is configured to define the nodes and the links such that the nodes' degrees (i.e., number of links) in the network topology follows a as power law distribution, as known in the art. The scale-free network model may be an extension of the Barabasi-Albert model. Specifically, the present disclosure may implement Soramäki-Cook algorithm scale-free network model for randomly generating directed, weighted, scale-free networks. The scale-free network model is a weighted network model such that the nodes' degrees follows the power law distribution. Herein, the nodes are connected by weighted links. The link weights represent the number of transactions made between pairs of nodes. Intuitively, a scale-free network has a few nodes with many links and a larger number of nodes with relatively many fewer links. Mathematically, the number of nodes that each node links to follows the power-law distribution. The power-law denoted as p(X) is proportional to X', for a greater than zero. Herein, a is a degree of preferential attachment.

Optionally, the method 100 further comprises scaling value of the transactions for any one of the nodes based on degree of association of the corresponding node in the network topology. As discussed, the larger banks have higher contributions to the network. Larger banks may also send higher-valued transactions. In the present examples, the nodes are allocated scaling values. Herein, the scaling values for the nodes representing larger banks are higher than for nodes representing smaller banks. In other words, the more links a node has to other nodes in the network, the higher its scaling value.

Depending upon the number of banks and total number of payments done in one day of the payment system, a scale-free network may be created. A scale-free network is one in which the nodes' degrees (i.e., the number of links each node has) follows a power-law distribution. Most nodes in a scale-free network have relatively few links, and a few nodes have a large number of links. In order to realize the scale-free network for the payment system, the number of banks (n) and the number of links added per step (m) are obtained manually from the raw dataset of the payment system. The number of links added per step (m) is equal to the average number of payments in the system per day divided by the number of banks in the system. Two additional parameters, the initial number of banks (no) and the degree of preferential attachment (a), can be tuned so that the resulting networks match any known aspects of network topology (e.g., clustering coefficient, reciprocity, average path length) or may be based on expert opinion. Next, using these inputs, the implementation of the scale-free network begins by adding the initial number of nodes no. The rest of the nodes are appended one by one until the desired number of nodes is obtained. For each node that is added, m links are also added. Finally, additional links are added so that the sum of weights is equal to multiplication of m and n. In case while adding links, a similar link already exists between a pair of nodes, rather than drawing another link, the weight of the existing similar link is increased by one unit. Also, while drawing links the source and target node for each link is determined probabilistically according to preferential attachment governed by the parameter a. Herein, the links are assigned to nodes having a greater number of links.

Figure 3:
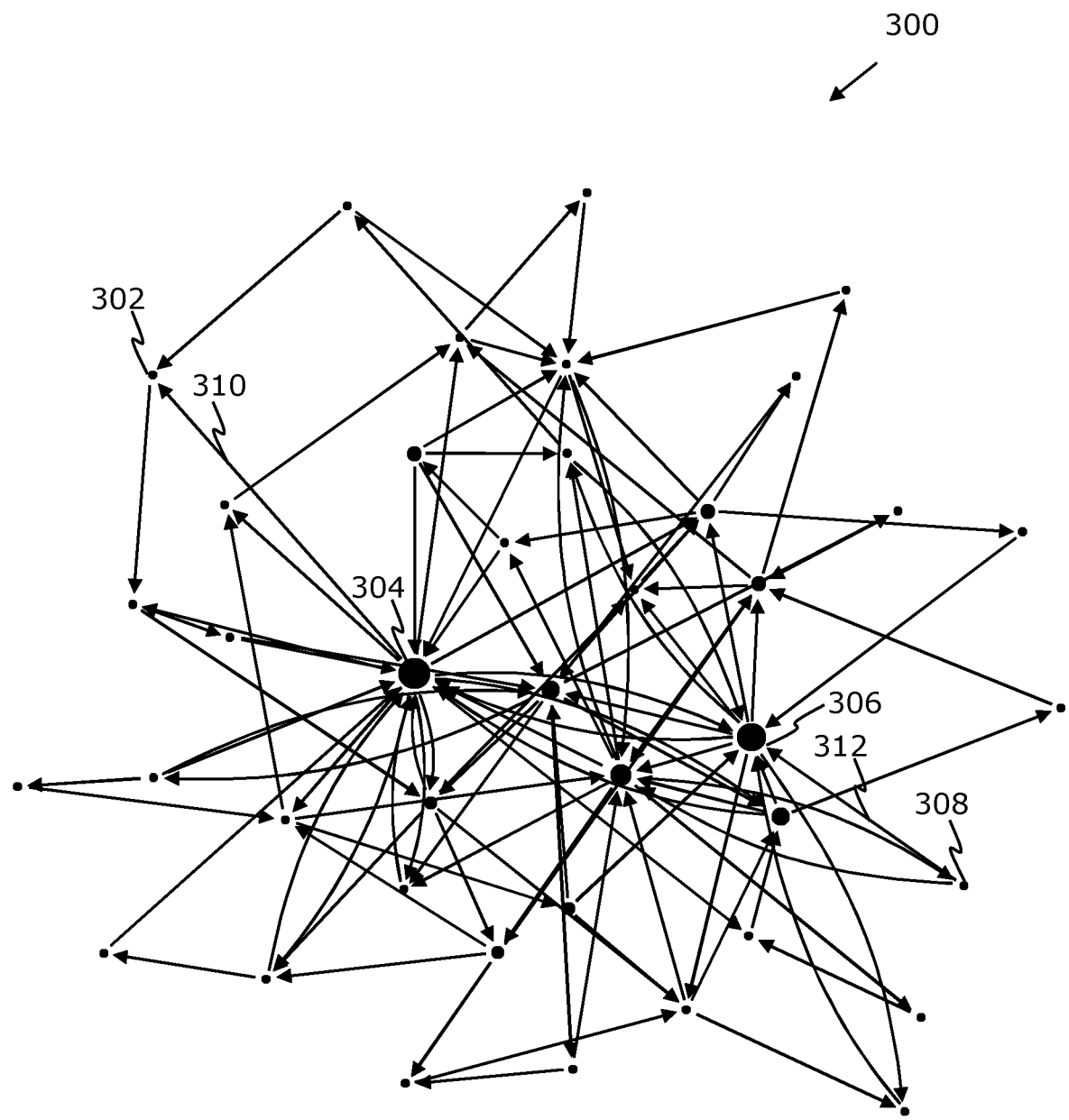
FIG. 3 is an illustration of a scale-free network topology, according to one embodiment of the teachings herein.

Referring to FIG. 3, there is an illustration of an exemplary scale-free network topology 300, according to one embodiment of the teachings herein. The network topology 300, generally, follows a power law distribution for a payment system. The exemplary network topology 300 has a number of nodes such as, 302, 304, 306, 308. The links denote the possible relations between the banks. For example, the transaction from the node 304 to 302 is denoted by the link 310. Similarly, the transaction from the node 308 to 306 is denoted by the link 312. The darker nodes such as nodes 304 and 306 denote large banks. The network topology 300 is drawn for a payment system having the following aggregate information n=40, $n_0$=4, m=3 and α=1.

Figure 4A:
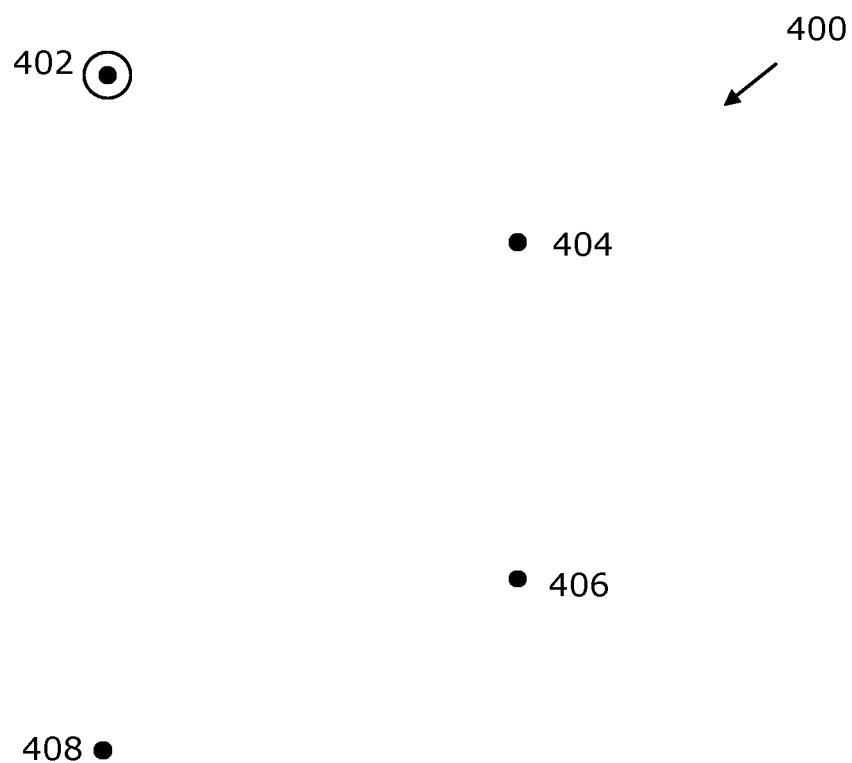
FIGS. 4A-4F are illustration of steps involved in obtaining a network topology that follow the power law distribution, according to one embodiment of the teachings herein.
Figure 4B:
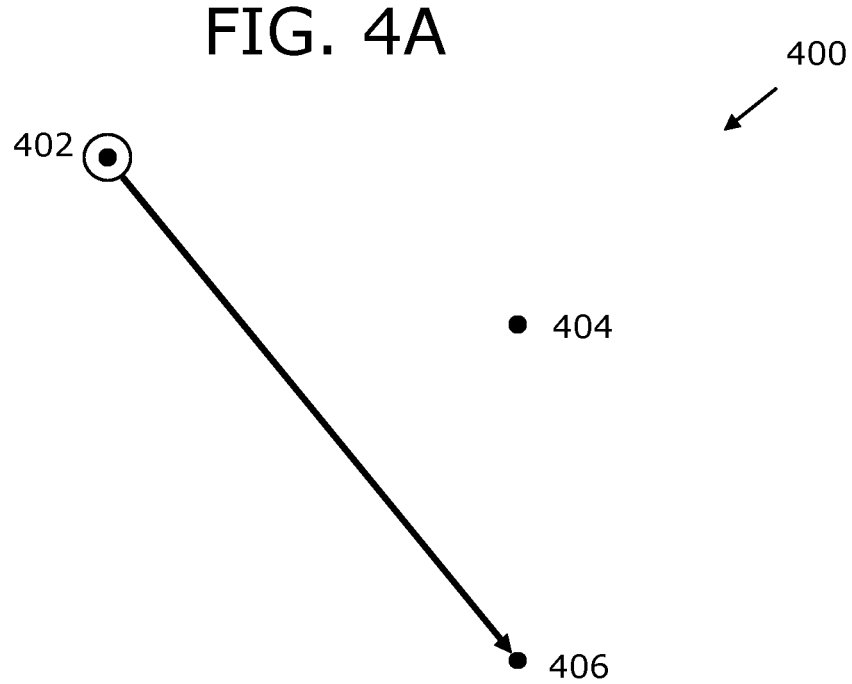
Figure 4C:
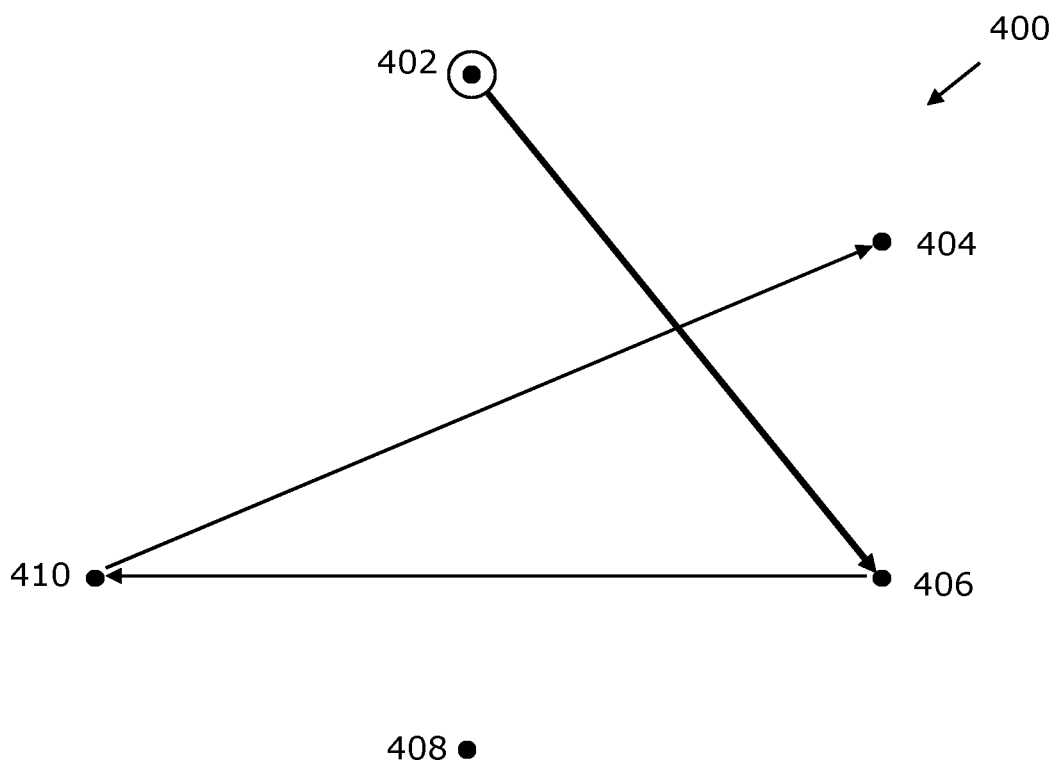
Figure 4D:
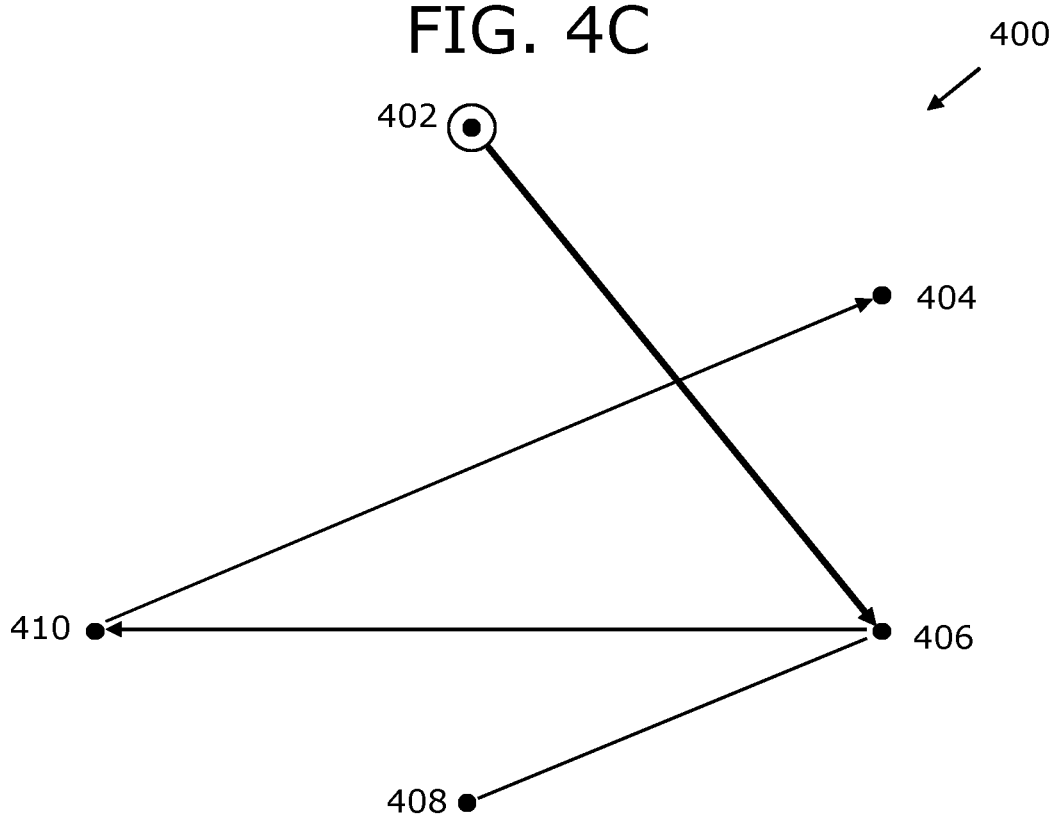
Figure 4E:
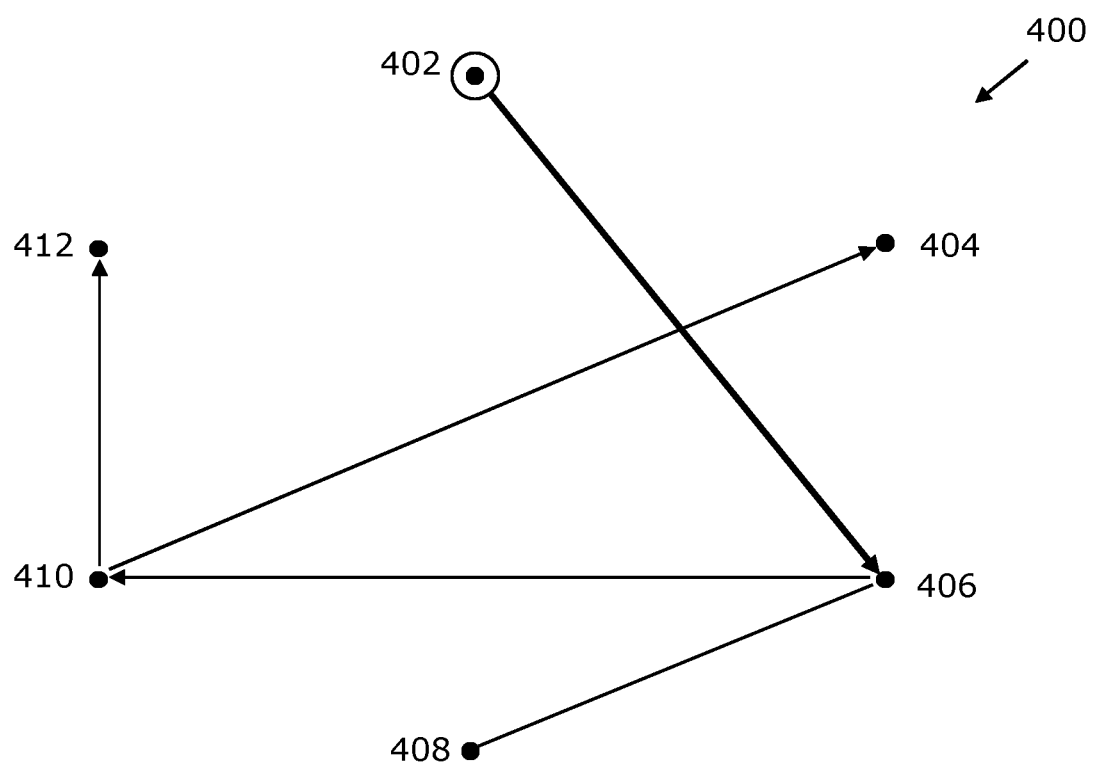
Figure 4F:
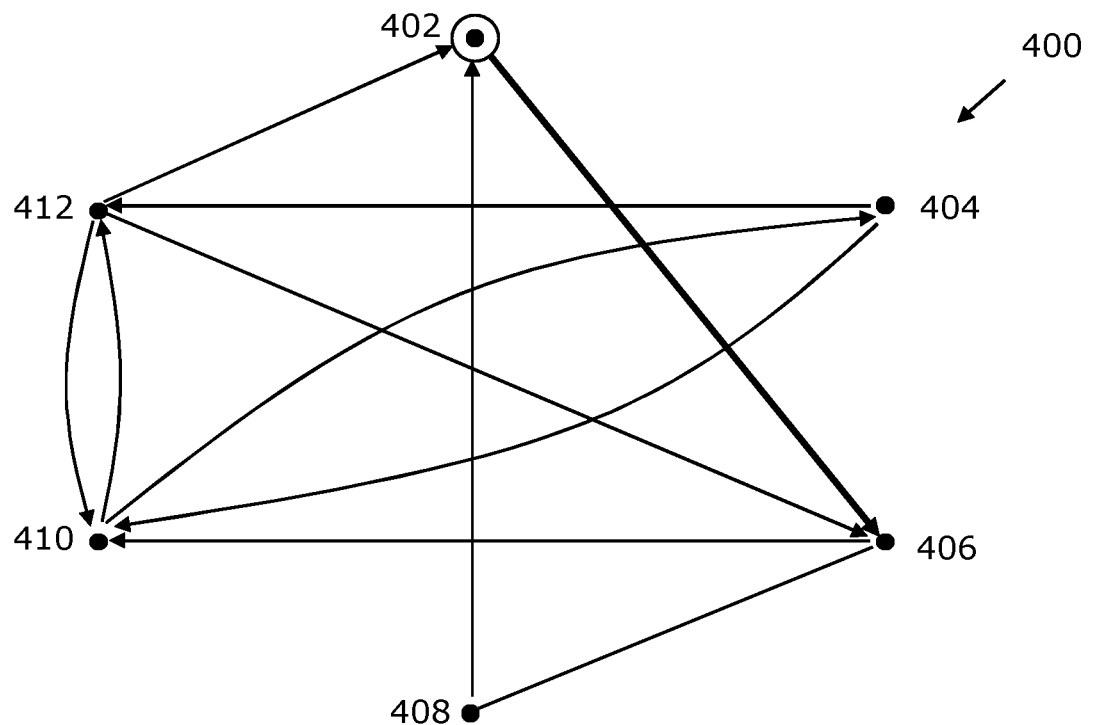

Further, referring to FIGS. 4A-4F, there are shown exemplary steps involved in obtaining the network topology similar to 300 of FIG. 3, according to one embodiment of the teachings herein. Herein, the detailed steps for obtaining the scale-free network topology are shown on a very small network. As discussed, the network topology 300 is drawn for a payment system having the following aggregate information n=40, $n_0$=4, m=3 and α=1. Here we show exemplary steps for a smaller network with the following aggregate information: n=6, $n_0$=4, m=3 and α=1. Initially a set of $n_0$ nodes are taken as shown in FIG. 4A. In FIG. 4A, the set of $n_0$ nodes are denoted by 402, 404, 406 and 408. In the next step as shown in FIG. 4B, m−2 links are added to the set of $n_0$ nodes of FIG. 4A. Since m is equal to 3 only one link is directed from the node 402 to 406. In the next step as shown in FIG. 4C, a fifth node 410 is added. The fifth node 410 is added along with an incoming and an outgoing link. In the next step as shown in FIG. 4D, m−2 links are added. Since m is equal to 3 only one link is directed between the third node 406 and the fourth node 408. In the next step as shown in FIG. 4E, a sixth node 412 along with an incoming and an outgoing link is appended. Finally, in the last step as shown in FIG. 4F, the remaining no multiplied by m links are added.

Figure 5:
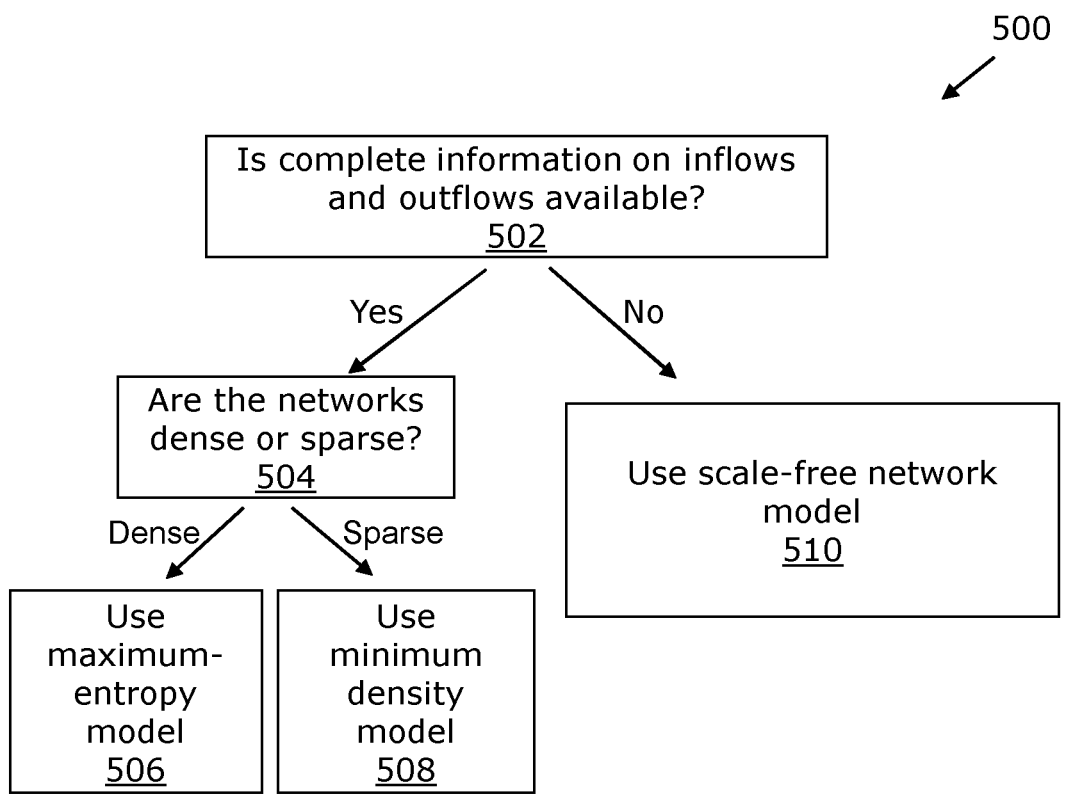
FIG. 5 is a block diagram of a scheme for selecting a network generation model, according to one embodiment of the teachings herein.

Furthermore, referring to FIG. 5, there is an illustration of an exemplary block diagram of a scheme 500 for selecting a network generation model, according to one embodiment of the teachings herein. As shown, the scheme 500 comprises a first decision making block 502, a second decision making block 504, a maximum entropy network model block 506, a minimum density network model block 508 and a scale-free network model block 510. The first decision making block 502 decides depending upon available aggregate information whether to opt for a network reconstruction model (i.e. the maximum entropy network model block 506 or the minimum density network model block 508, both being examples of network reconstruction models) or a scale-free network topology (block 510). If the aggregated information contains the complete information of the inflows and outflows of each persona (i.e. Yes), the maximum entropy network model block 506 or the minimum density network model block 508 is selected; otherwise (i.e. No), the scale-free network model block 510 is selected. For the scale-free network model block 510, the number of nodes is equal to the number of personas, the number of arcs per step is equal to the number of transactions divided by the number of personas and the remaining parameters no and a are tuned so that the generated networks match with the known properties of the system. The decision to choose from the maximum entropy block 506 or the minimum density network model block 508 is made by the second decision making block 504. If it is known that the true network for real dataset is dense, the maximum entropy network model block 506 is selected. However, if it is known that the true network for real dataset is sparse, the minimum density network model block 508 is selected.

The method 100 further comprises generating the synthetic data including information about the distribution of the one or more transactions based on the created network topology and the aggregate dataset. Herein, the method 100 first includes calculating/approximating the distribution of transaction values and then generating the transaction values from the calculated/approximated distribution. As discussed, in an embodiment, the link weight values for the network generated in the scheme 500 may represent the number of transactions between each pair of nodes. In another embodiment, the link weight values may represent both the number and total value of transactions between each pair of nodes. However, the knowledge of the value of each transaction between each pair of nodes and time of occurrence of each transaction is still not known. Hence, the generated synthetic data is incomplete.

In order to determine the value of each transaction, a number of methods may be implemented. The simplest method is to assume that all transactions between a pair of personas are of equal value. In such cases each transaction value may be obtained by dividing the total transaction value occurring between two personas by the total number of transactions existing between the two personas. For example, if for a pair of nodes, the number of loan transactions that occur from a first node to a second node is four and the total value of these four loan transactions is ten then each transaction value may be defined as 2.5. However, the said method does not provide optimum results. Other methods may be applied by exploiting the available aggregate information.

Optionally, the method 100 further comprises defining a probability distribution of the one or more transactions and tuning the parameters of the defined probability distribution based on the available aggregate dataset for generating the synthetic data. As discussed, the value of each transaction that exists between a pair of personas may be found by number of ways. In one embodiment, the value of each transaction may be obtained by employing the probability distribution. The probability distribution may be lognormal distribution, uniform distribution, gaussian distribution and the likes.

In an example, the probability distribution defined for generating a synthetic data is a lognormal distribution. The lognormal distribution defined on a random variable(X) is defined as an exponentiated normal random variable. That is, if X follows as a normal distribution with mean ($\mu$) and variance ($\sigma^2$), then $e^X$ follows the lognormal distribution with parameters $\mu$ and $\sigma^2$. The lognormal distribution is right-skewed and takes only positive values. The lognormal distribution is used for synthetic data generation of payment data. It may be understood that, in payment data only aggregate information like mean and median value of the payments in the payment system are generally publicly available. The lognormal distribution is obtained for the payment data so that the aggregate information like mean and medium are satisfied. Further, since the lognormal distribution is rightly skewed and unbounded, the maximum value of the individual transaction may be specified in the aggregate information. In the absence of the maximum value, individual transactions may take values larger than the global gross domestic product (GDP). Hence, the lognormal distribution is truncated at the maximum value. For example, for a payment system having aggregate information of the mean transactional value as 2.5 million, the median value as 30,000 and the maximum value as 2 billion, the lognormal distribution with parameters $\mu$=10.3 and $\sigma^2$=3.1, truncated at 2 billion may be used to the generate synthetic data.

In another example, the probability distribution is a uniform distribution. As discussed, for the loan data the total number and the total value of the loans for each persona are typically known. Using this the maximum entropy network model or the minimum density network model is used to estimate the total number and total value of loans between pairs of personas. If the value and volume of transactions between each pair of participants is known, then the mean value of loans between each pair of participants which is equal to the value divided by the volume, would also be known. Individual transaction values may then be sampled from a uniform distribution centred at the mean value of loans between the pair of nodes.

Optionally, the method 100 further comprises tuning the network generation model based on available information related to the multiple entities, such that the generated network topology from the tuned network generation model corresponds to actual network topology of multiple entities. Often certain details of the real data system may be known. For example, for a loan data, suppose it is known that certain pair of banks and transactions never do business with each other. That is, for some pairs of bank and corporation, the number and the value of transactions is zero. In such case, the weights of the links drawn between the respective pairs of banks and corporations may be set to zero directly. Alternatively, in some cases the number or the value of loan made between some pair of nodes may be known. In such cases, while drawing the network topology these details may be straightaway appended.

Figure 6A:
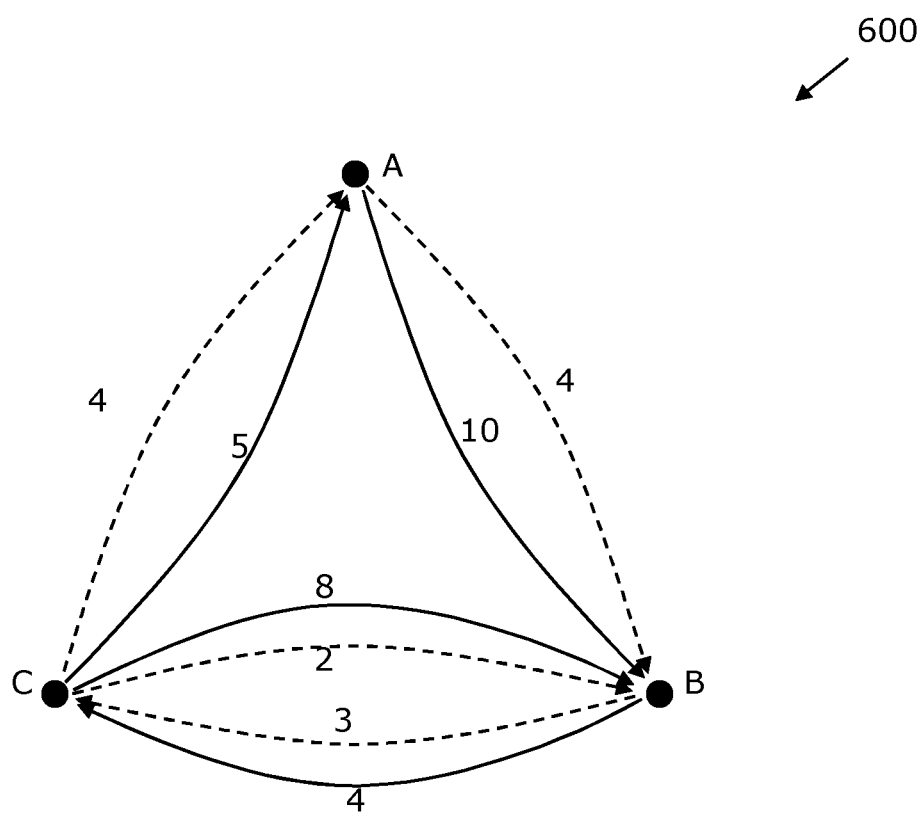
FIG. 6A is an illustration of a network topology for denoting both total number and value of transactions in a network topology model, according to one embodiment of the teachings herein.

Referring to FIG. 6A, there is an illustration of an exemplary network topology 600 for denoting both number and value of transactions in the network topology model, according to one embodiment of the teachings herein. As shown, the network topology 600 comprises three nodes A, B and C. The node A transfer a total of four transactions with total value of the transactions being 10 to the node B. The node B transfer a total of three transactions with total value of the transactions being four to the node C. The node C transfer a total of two transactions with total value of the transactions being eight to the node B. The node C transfer a total of four transactions with total value of the transactions being five to the node A. To convert the network topology 600 to loans, a list of loans between two nodes is first created using the number link property. Note that in this example all nodes represent banks that can make and/or receive loans to/from other banks. Following is the list of loans obtained as shown in table 602 in FIG. 6B.

To fill in the values, the constraints of the network topology 600 need to be respected. Various methods may be applied to find the values in table 602 of FIG. 6B. The simplest method for retrieving the individual loan values is to assume that all loans between a pair of institutions are of equal value. For the network topology 600 the following values are obtained using the said method as shown in table 604 of FIG. 6C.

For the payments data, it may be contemplated that the actual payment times are rarely known. The payment system's opening hours and the proportion of payments that occur within certain time blocks may be known. In order to assign a time for each transaction, payment times may be generated uniformly in the smallest time interval such that the proportion of payments in the real system that take place during each interval is known. For example, it may be known that for the payment system, 80 percent of payments are made between 8 AM and 10 AM, and the remaining 20 percent payments are made between 10 AM and 5 PM. Herein, the timestamp of each payment may be generated by selecting the interval 8 AM to 10 AM with a probability of 0.8 or by selecting the time interval 10 AM to 5 PM with the probability of 0.2. Subsequently, the time may be sampled uniformly within the selected time interval.

Figure 7A:
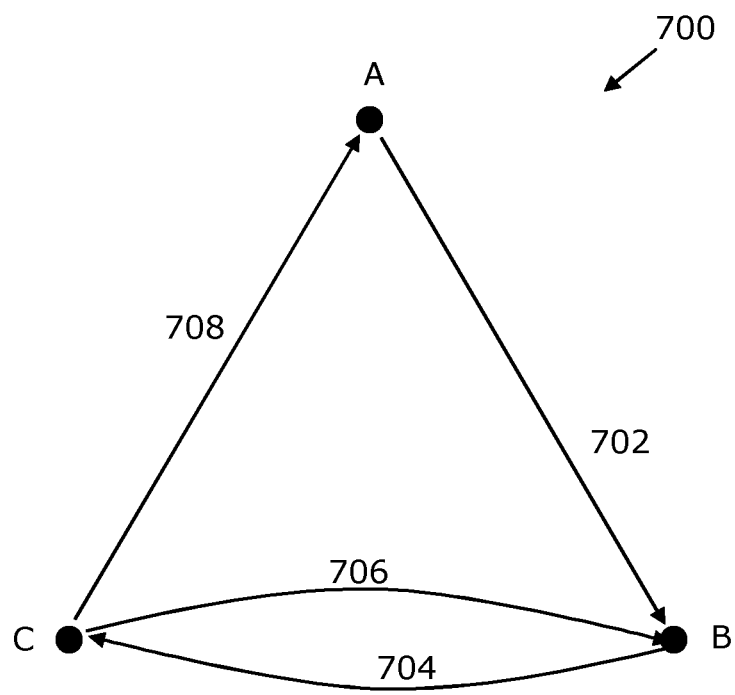
FIG. 7A is an illustration of a network topology for a payment system, according to one embodiment of the teachings herein.
Figure 7B:
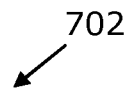
FIG. 7B is a table for representing values of the network topology of FIG. 7A, according to one embodiment of the teachings herein.

Referring to FIG. 7A, there is an illustration of an exemplary network topology 700 for a payment system, according to one embodiment of the teachings herein. The network topology 700 comprises a first node A, a second node B and a third node C. The first node A has a directed link 702 to the second node B, with a link weight of four. The second node B has a directed link 704 to the third node C, with the link weight of three. The third node C has a directed link 706 to the second node B, with a link weight of two. The third node C has another directed link 708 to the first node A, with a link weight of four. This means that the synthetic dataset to be generated from the network topology 700 will have the following form as shown in table 702 of FIG. 7B, and the goal of the final step is to fill in the missing values. The transaction values for the network topology 700 can be generated in two steps. First a probability distribution is chosen. Next the parameters of the chosen probability distribution are tuned based on information about the actual transaction values.

Figure 8A:
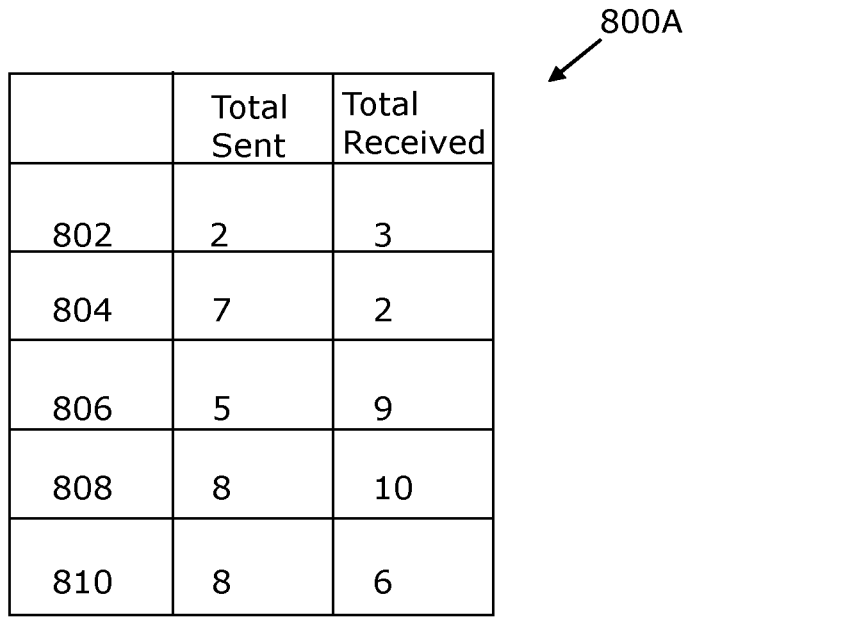
FIG. 8A is a table for representing total loans received and total loans disbursed by banks of a payment system, according to one embodiment of the teachings herein.
Figure 8B:
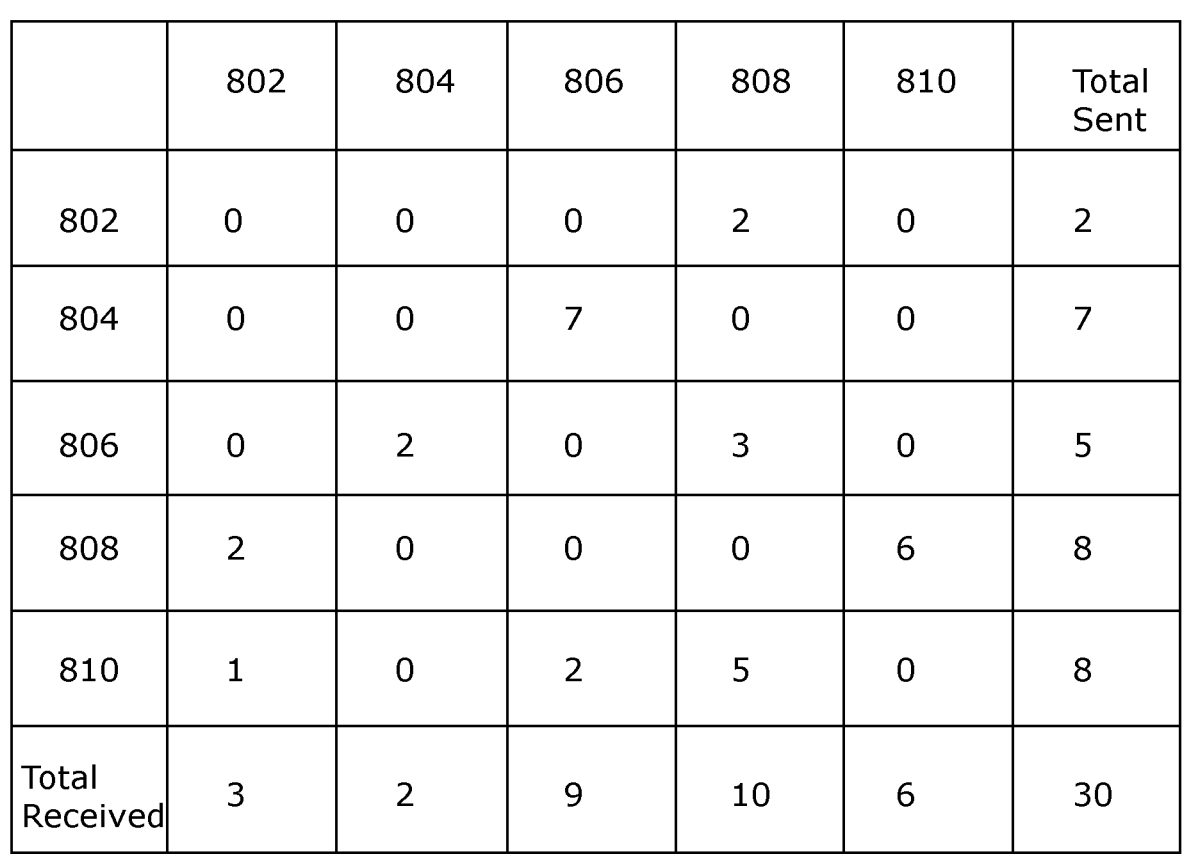
FIG. 8B is a table for representing individual loans received and disbursed by the banks of the payment system of FIG. 8A, according to one embodiment of the teachings herein.

Referring to FIGS. 8A and 8B, there are shown exemplary tables to be used for obtaining the individual transaction values for each bank in a loan system, according to one embodiment of the teachings herein. Such loan system has a first bank 802, a second bank 804, a third bank 806, a fourth bank 808 and a fifth bank 810, as represented in tables 800A and 800B, with such institutions lending (i.e. send loans) as well as borrowing (i.e. receive loans).

Referring to table 800A of FIG. 8A, there are represented the total loans received and total loans sent by each of the banks 802, 804, 806, 808 and 810 of the loan system. As shown, the first bank 802 provides a total of 2 loans and receives a total of 3 loans. The second bank 804 provides a total of 7 loans and receives a total of 2 loans. The third bank 806 provides a total of 5 loans and receives a total of 9 loans. The fourth bank 808 provides a total of 8 loans and receives a total of 10 loans and a fifth bank 810 provides a total of 8 loans and receives a total of 6 loans.

Referring to table 800B of FIG. 8B, there are represented the values of individual loans for the loan system as obtained using the minimum density network model as per the method 100 of the present disclosure. As obtained, the first bank 802 provides a total of 2 loans to the fourth bank 808. The second bank 804 provides a total of 7 loans to the third bank 806. The third bank 806 provides a total of 2 loans to the second bank 804 and provides a total of 3 loans to the fourth bank 808. The fourth bank 808 provides a total of 2 loans to the first bank 802 and provides a total of 6 loans to the fifth bank 810. The fifth bank 810 provides a total of 1 loan to the first bank 802, 2 loans to the third bank 806 and 5 loans to the fourth bank 808.

As discussed in the preceding paragraphs, the scale-free Network model is best suited for payment systems, for example CHAPS. Also, as discussed, CHAPS (Clearing House Automated Payment System) is a UK based organization that is administered by Bank of England and allows large financial transactions in denominations of British pounds. According to a survey of the CHAPS system from 2008, the number of nodes was 14, the average number of links is 160, the average number of payments per day is 105938, the average connectivity is of 0.88 and the average path length is 1.1. When the scale-free network model is applied on the aggregate data of the CHAPS network in order to generate the synthetic data, the number of nodes obtained is 14, the number of links obtained is 156.3, the number of payments per day obtained is 105000, the average connectivity obtained is of 0.86 and the average path length obtained is 1.1. Based a comparison made with real-world data of the CHAPS system, it can be reasonably assumed that the scale-free network model of the present disclosure is within a +/−10% range of the real-world payment network.

Moreover, the present description also relates to the system 110 for generating synthetic data from an aggregate dataset involving multiple entities as described above. The various embodiments and variants disclosed above apply mutatis mutandis to the system 110 for generating synthetic data from an aggregate dataset involving multiple entities. Optionally, the data processing arrangement 112 is further configured to define a probability distribution of the one or more transactions and tune the parameters of the defined probability distribution based on the aggregate dataset for generating the synthetic data.

Further, an embodiment of the teachings described herein provides a computer-readable medium carrying instructions that when loaded into and executed by a data processing arrangement (such as the data processing arrangement 112) causes the data processing arrangement to execute the aforesaid method 100.

Optionally, the computer-readable medium is a tangible device for storing instructions for use by an instruction execution device. The computer-readable medium can direct a computer, other programmable data processing apparatus, or other devices to function in a particular manner, such that the instructions stored in the computer-readable medium cause a series of steps to implement the function specified in a flowchart and/or a schematic block diagram corresponding to the instructions. The computer-readable medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Further, an embodiment of the teachings described herein provides a software module system comprising software modules to be executed by a data processing arrangement (such as the data processing arrangement 112) for determining vulnerability of nodes in a transaction network, wherein the software module system comprises:

a software module for defining a set of personas, wherein the set of personas is defined based on a number of the plurality of entities and/or a type of at least one of the plurality of entities;

a software module for selecting a network generation model based on the defined set of personas and the aggregate dataset related thereto;

a software module for generating a network topology comprising nodes and links between nodes using the selected network generation model,
wherein a node represents one of the personas in the set of personas, and
wherein a link is between two nodes, the link representing one or more transactions between the personas represented by the two nodes; and a software module for generating the synthetic data including information about distribution of the one or more transactions based on the created network topology and the aggregate dataset.

Throughout the present disclosure, the term "software module" refers to a software program comprising executable instructions to perform one or more distinctive data processing operations. In an example, the software modules of the software module system may include, but are not limited to, a transaction data receiving software module, a matrix determining software module, a centrality determining software module, a rank determining software module. The software module may be stored as an instruction on a computer-readable medium (as discussed above) and executed by the data processing arrangement (such as the data processing arrangement 112). Optionally, the software module system is a set of one or more software modules as a part of a software instruction or instruction (as mentioned above). However, each software module serves a unique and separate operation. The software modules may be pre-installed on a system or can be downloaded from a client network, a remote data storage, or internet. The software modules may be a System, Applications and Products (SAP) module, an enterprise resource planning (ERP) software, and so on.

In an embodiment, all software modules of the software module system are implemented as separate software modules. In another embodiment, two or more software modules of the software module system are implemented as an integrated software module.

Several software options for payment system simulation are available, and some FMIs choose to develop their own simulators in-house, but in either case a payment system simulation analysis relies on reasonable payments data as input.

The method of the present disclosure can be implemented in many real-world scenarios. One practical example is the use of the data in payment system modernization programs. Payments data is difficult to obtain even for the operators of the payment system. Payment system operators may possess only the high-level descriptions of the system. At the same time, a data-driven approach can be key to an efficient design of a payment system. Since the method of the present disclosure is suited for scenarios when inputs to the synthetic data generation are aggregate system-level statistical properties and expert judgement, it can be applied in such scenarios.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method for generating synthetic data from an aggregate dataset related to a plurality of entities, the method comprising:
    defining a set of personas, wherein the set of personas is defined based on a number of the plurality of entities and/or a type of at least one of the plurality of entities;
    selecting a network generation model based on the defined set of personas and the aggregate dataset related thereto;
    generating a network topology comprising nodes and links between nodes using the selected network generation model,
        wherein a node represents one of the personas in the set of personas, and
        wherein a link is between two nodes, the link representing one or more transactions between the personas represented by the two nodes; and
    generating the synthetic data including information about distribution of the one or more transactions based on the created network topology and the aggregate dataset.

2. A method according to claim 1 further comprising:
    defining a probability distribution of the one or more transactions; and
    tuning the parameters of the defined probability distribution based on the aggregate dataset for generating the synthetic data.

3. A method according to claim 1, wherein each of the links is assigned with a link weight value representing one or more of number of the transactions and value of the transactions associated with the corresponding link.

4. A method according to claim 3, wherein at least one of number of links and the link weight values associated with the links for any one of the nodes are determined based on one or more of total inflows and total outflows for the corresponding node.

5. A method according to claim 1 further comprising scaling value of the transactions for any one of the nodes based on degree of association of the corresponding node in the network topology.

6. A method according to claim 1, wherein the network generation model utilizes market share information about the entities to generate the network topology.

7. A method according to claim 1 further comprising tuning the network generation model based on available information related to the multiple entities, such that the generated network topology from the tuned network generation model corresponds to actual network topology of multiple entities.

8. A method according to claim 1, wherein the network generation model is based on a Maximum Entropy network model configured to maximize the number of links in the network topology.

9. A method according to claim 1, wherein the network generation model is based on a Minimum Density network model configured to minimize the number of links in the network topology.

10. A method according to claim 1, wherein the network generation model is based on a Scale-free Network model configured to define the nodes and the links such that the network topology follows a power law distribution.

11. A method according to claim 1, wherein the aggregate dataset is one of a loan dataset and a payment dataset.

12. A method according claim 1, wherein the aggregate dataset comprises one or more of: mean, median, minimum and maximum of the transaction values associated with the multiple entities.

13. A non-transitory computer-readable medium carrying instructions that when loaded into and executed by a data processing arrangement causes the data processing arrangement to execute the method according to claim 1.

* * * * *